E. A. L. GUIU.
AUTOMATIC APPARATUS FOR REMOVING LEAVES, REFUSE, OR LARGE PARTICLES CARRIED ALONG BY WATER OR ALL FLOWING FLUIDS.
APPLICATION FILED FEB. 14, 1913.
1,128,602.
Patented Feb. 16, 1915.
2 SHEETS—SHEET 1.
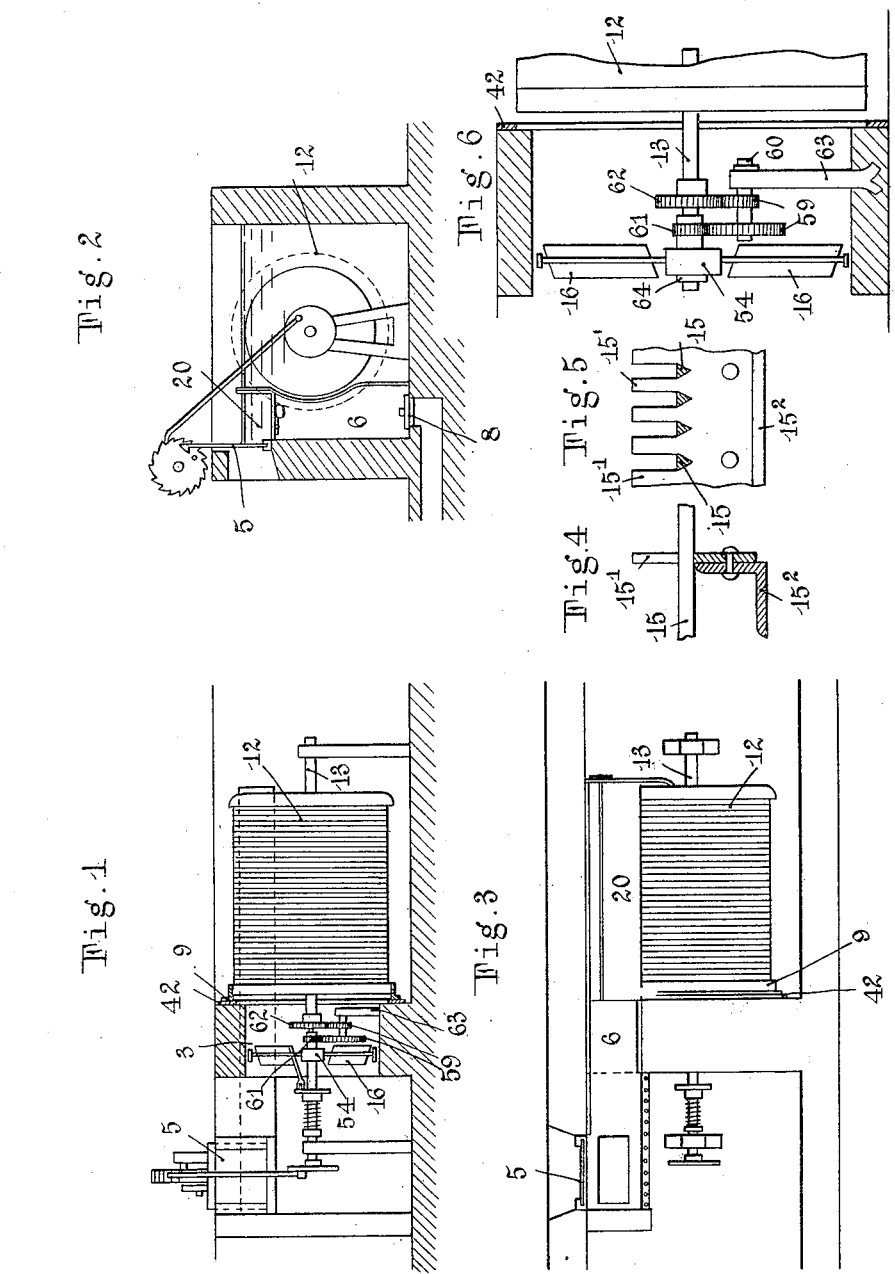

E. A. L. GUIU.
AUTOMATIC APPARATUS FOR REMOVING LEAVES, REFUSE, OR LARGE PARTICLES CARRIED ALONG BY WATER OR ALL FLOWING FLUIDS.
APPLICATION FILED FEB. 14, 1913.

1,128,602.

Patented Feb. 16, 1915.

2 SHEETS—SHEET 2.

WITNESSES

INVENTOR
E. A. L. GUIU
BY
ATTORNEY

UNITED STATES PATENT OFFICE.

ERNEST ALPHONSE LAURENT GUIU, OF PRATS-DE-MOLLO, FRANCE.

AUTOMATIC APPARATUS FOR REMOVING LEAVES, REFUSE, OR LARGE PARTICLES CARRIED ALONG BY WATER OR ALL FLOWING FLUIDS.

1,128,602.

Specification of Letters Patent.

Patented Feb. 16, 1915.

Application filed February 14, 1913. Serial No. 748,390.

*To all whom it may concern:*

Be it known that I, ERNEST ALPHONSE LAURENT GUIU, a citizen of the French Republic, residing at Prats-de-Mollo, Pyrénées-Orientales, France, have invented certain new and useful Improvements in Automatic Apparatus for Removing Leaves, Refuse, or Large Particles Carried Along by Water or All Flowing Fluids, of which the following is a full, clear, and exact description.

This invention relates to improvements in apparatus for the automatic elimination of leaves, detritus and large particles borne along by the water of streams, rivers and the like.

These improvements relate to apparatus comprising a rotary drum or screen turning about a shaft arranged parallel to the current of the water, this drum being arranged perpendicular before a barrier constructed across a feed canal in combination with a joint in the form of pressed leather and a collecting trough receiving the leaves and detritus which are discharged outside of the installation.

Figure 7:
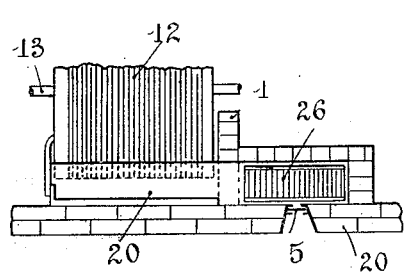
Figure 8:
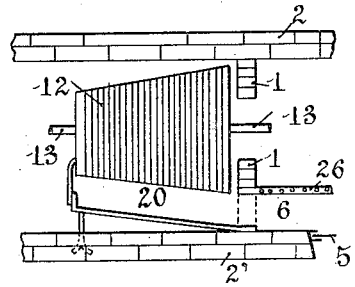
Figure 9:
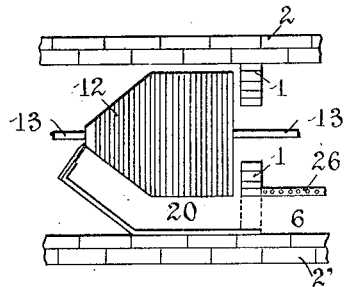
Figure 10:
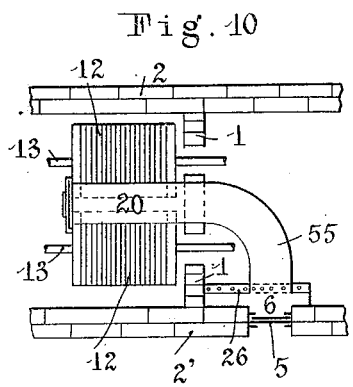
Figure 11:
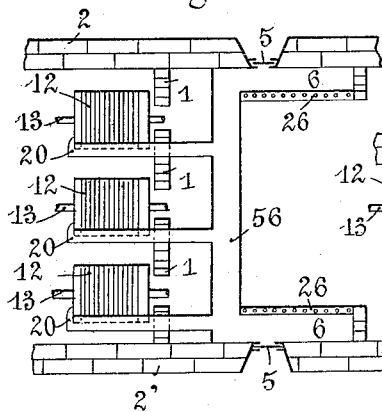
Figure 12:
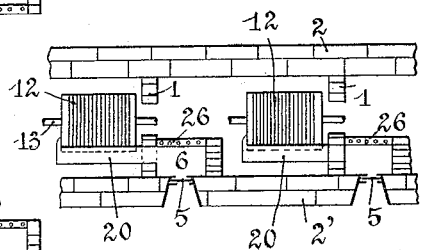

Upon the annexed drawings, Figure 1 is a longitudinal section of the whole of the apparatus; Fig. 2 is a transverse section; Fig. 3 is a plan view; Figs. 4 and 5 are fragmental detail views showing the mounting of the drum screen; Fig. 6 is a side elevation showing a screw for driving the drum, the screw and drum being co-axial; Fig. 7 is a fragmental plan view showing a modification in which the grating of the decanting chamber is disposed horizontally; Fig. 8 is another modification showing a conical drum; Fig. 9 is a plan showing a modification having a drum partly conical and partly cylindrical; Fig. 10 is a plan of another modification in which two drums are disposed parallel to each other in the same channel; Fig. 11 is a plan of another modification in which several drums are disposed parallelly in the same channel; and Fig. 12 is a plan of a modification in which the drums are disposed in tandem.

The apparatus to which the improvements are applied are composed of a cylindrical drum screen 12 rotating about a shaft 13 parallel to the current of the water and arranged perpendicularly before a barrier constructed across a feed canal, in which barrier has been provided an opening 3. The rotary screen is provided with a joint 9 which rests against a ring fixed at the opening 3 of the barrier, on the up-stream side.

The rotation of the drum screen 12 is obtained by means of a paddle screw 16, operated by the water coming from up-stream. On one side of the drum screen 12 is arranged a trough 20 in which the leaves and other detritus which are detached from the filtering wall are collected and carried toward the outside through a gate 5, permanently or intermittently open, or into a decantation chamber 6 with grating 26, whence the opening of a plug 8 discharges them at greater or smaller intervals. The filtering wall of the grid or sieve 12 is formed by parallel bars 15 mounted in metallic chases $15^1$ (Figs. 1, 3, 4 and 5) fixed on a framework $15^2$ by the means of rivets.

The bars 15 of the screen are of triangular section (Fig. 4) one of their apexes being turned toward the center of the screen. That disposition will have for its effect to produce a maximum contraction of water, and consequently a more accentuated current at the outer surface of the bars, that is to say at the point where the taking off of leaves in the trough is made.

The drum 12 may be rotated by the action of the stream of water upon the screw, composed of the blades 16, as follows: The hub 54 of the screw is held loosely on the shaft 13 by the collar 64 and carries a pinion 61 which engages and rotates one gear wheel of the double counter pinion 59, the other wheel of which engages and rotates the pinion 62 and consequently the shaft 13 on which the pinion 62 is fixed, and consequently the drum 12 fixedly mounted on the shaft 13. As will be seen, the double pinion 59 turns on the shaft 60 fixed to the bracket 63. The screw and the drum are co-axial with each other, and rotation of the latter is reduced by the reducing gear composed of the pinions 61, 59 and 62.

The grid or grating 26 of the decanting chamber 6 may be disposed horizontally as shown in Fig. 7, or vertically as shown in Fig. 3.

Fig. 8 shows a variable form of the apparatus in which the grid or screen 12 has a conical shape; in this case, the trough is oblique with respect to the axis of said screen, that is to say, it is disposed in a parallel direction with the conical wall. Another disposition, shown by Fig. 9 gives to the screen 12 a cylindro-conical shape; in this arrangement, the trough shows itself an angular shape.

Fig. 10 shows another variation in which two screens 12 are disposed in a parallel direction in the same channel and divide the total volume of the passing water. The barrage possesses as many circular openings as there are screens 12, but the trough 20 is common to both screens. It ends in a single collector 55 and in a single decanting chamber 6.

Fig. 11 represents another disposition in which several rotating screens 12 (in any number) are disposed in a parallel direction; in this case, the troughs 20 are separated; but they emerge all in a common collector 56. At both ends of this collector decanting chambers 6 are provided.

Fig. 12 shows an arrangement comprising two or more rotating drums functioning one after the other in the same channel one after the other, each receiving the water previously acted upon by the preceding drum. In this arrangement there exist as many barriers 1, troughs 20 and decanting chambers as there are drums.

I claim as my invention:—

1. In an apparatus for separating leaves and the like from streams of water, the combination of a feed canal; a barrier across the same and provided with an opening; a revolving screen drum in front of the opening; a screw for revolving the drum; a collecting trough adapted to receive matter from the drum; and a decanting chamber connected with the trough and provided with a gate; said screen comprising a frame work, metallic chases fastened thereon, and bars wound around the frame and pinned in the chases and of triangular cross-section.

2. In an apparatus of the character described, the combination of a feed canal; a barrier across the same and provided with an opening; a revolving screen drum in front of the opening; a screw for revolving the drum; a collecting trough adapted to receive matter from the drum; and a decanting chamber connected with the trough and provided with a gate, said decanting chamber being provided with a horizontal grid.

3. In an apparatus of the character described, the combination of a feed canal; a barrier across the same and provided with an opening; a revolving screen drum in front of the opening; a screw for revolving the drum; a collecting trough adapted to receive matter from the drum; and a decanting chamber connected with the trough and provided with a gate, said screen drum being conical in shape and the trough disposed obliquely to the axis thereof.

In testimony whereof I affix my signature in presence of two witnesses.

ERNEST ALPHONSE LAURENT GUIU.

Witnesses:
S. POMPYNE,
A. BERUND.

Copies of this patent may be obtained for five cents each, by addressing the "Commissioner of Patents, Washington, D. C."